Jan. 16, 1968

B. LAST 3,363,465

FLUID METERS

Filed Sept. 28, 1964

INVENTOR
BERNARD LAST

BY Strauch, Nolan & Neale

ATTORNEYS

Jan. 16, 1968   B. LAST   3,363,465
FLUID METERS
Filed Sept. 28, 1964   2 Sheets-Sheet 2
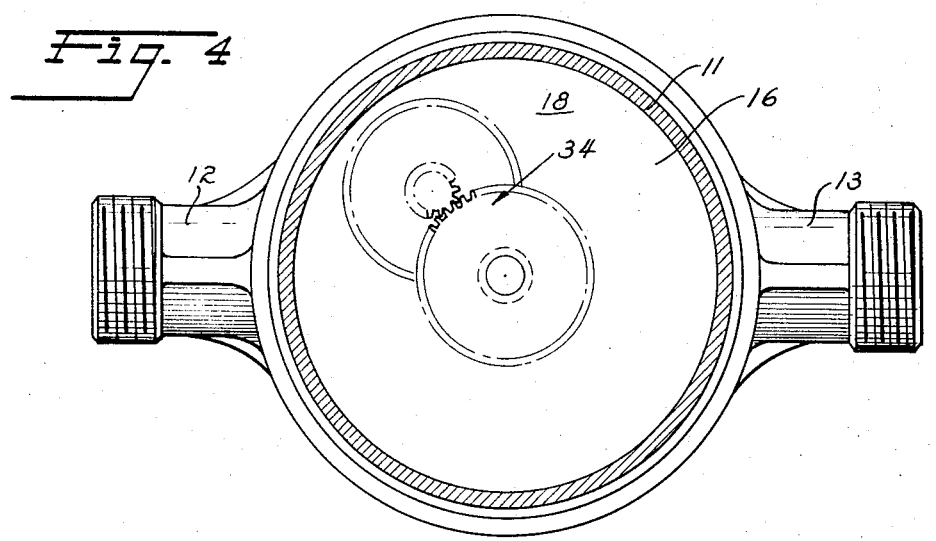
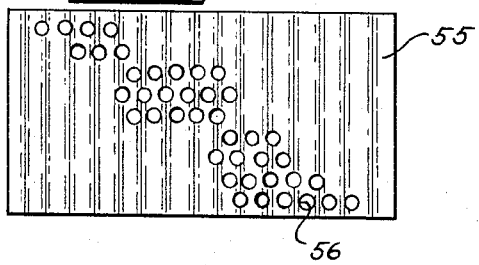
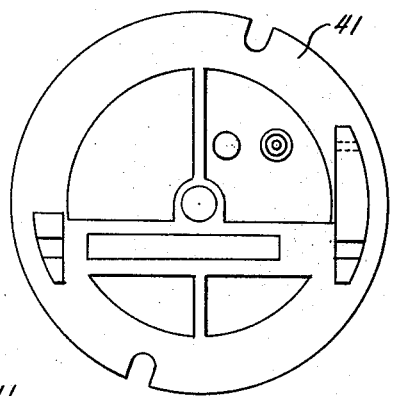
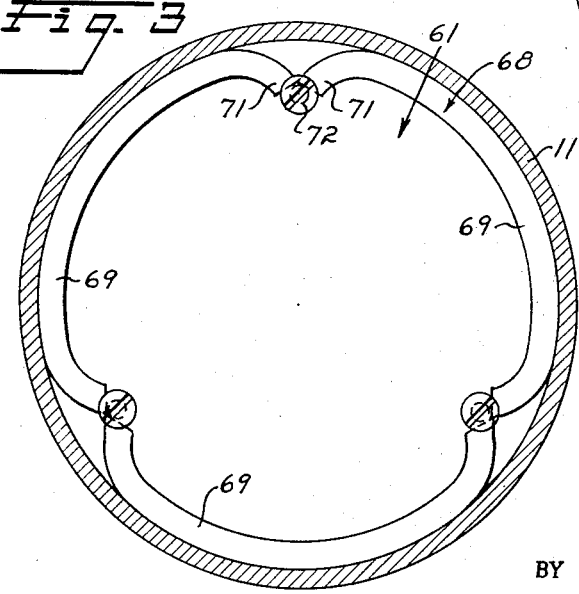
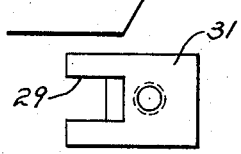
INVENTOR
BERNARD LAST
BY Strauch, Nolan & Neale
ATTORNEYS

United States Patent Office 3,363,465
Patented Jan. 16, 1968

3,363,465
FLUID METERS
Bernard Last, Uniontown, Pa., assignor to Rockwell Manufacturing Company, Pittsburgh, Pa., a corporation of Pennsylvania
Filed Sept. 28, 1964, Ser. No. 399,561
9 Claims. (Cl. 73—258)

ABSTRACT OF THE DISCLOSURE

A liquid meter comprises a casing body mounting a measuring chamber containing a nutating disc piston. Within the body a strainer is provided at the inlet to the measuring chamber in the form of a resilient perforated plate of non-rusting metal that biases the measuring chamber into sealing relation with the meter casing at the outlet port. The bottom opening of the casing is closed by a cover axially seated against a resilient washer and radially sealed by a cooperating groove and O-ring structure, and a removable segmented locking ring retains the cover on the casing. The casing interior above the measuring chamber is traversed by a nylon gear mounting plate having on its under side a measuring chamber pilot boss and against which the measuring chamber is urged by the bottom cover structure. This plate defines a register drive gear reduction chamber within the casing.

---

This invention relates to a novel liquid meter assembly and particularly to such embodying a compact arrangement of parts with a sealed gear chamber and a specially mounted measuring chamber.

The invention is to be disclosed as applied to nutating disc meters but may be used in other liquid meters wherein the measuring chamber is installed essentially as a unit within the body.

It is a major object of the invention to provide a novel meter assembly wherein gearing between liquid impelled element and an indicator is mounted in a special sealed chamber.

A further object of the invention is to provide a novel meter assembly wherein the reduction gearing to the register drive is carried by a plate seated within the meter body and a measuring chamber assembly is seated within the body and held by means of a cover to engage and maintain tight seating of said plate.

It is a further object of the invention to provide in a meter assembly an internal gear mounting plate having interfitting locating engagement with a measuring chamber assembly.

A further object of the invention is to provide a novel meter assembly wherein the entire measuring chamber assembly is laterally biased by a special spring arrangement.

It is a further object of the invention to provide in a meter assembly a combined liquid strainer and biasing spring for the measuring chamber assembly.

It is another object of the invention to provide a novel corrugated reticulated spring plate to serve as a strainer and a measuring chamber biasing spring in a meter assembly.

A further object of the invention is to provide a novel locking ring arrangement for the cover of a meter body.

Further objects of the invention will appear in connection with the appended claims and the annexed drawings wherein:

FIGURE 3 is a section on line 3—3 of FIGURE 1, showing the locking ring assembly;

FIGURE 4 is a section on line 4—4 of FIGURE 1 showing the sealed gear chamber;

FIGURE 5 is a side view of the relaxed spring strainer plate;

FIGURE 6 is a top view of the base plate of the register; and

FIGURE 7 is a plan view of the drive dog engaged by the piston spindle.

Figure 1:
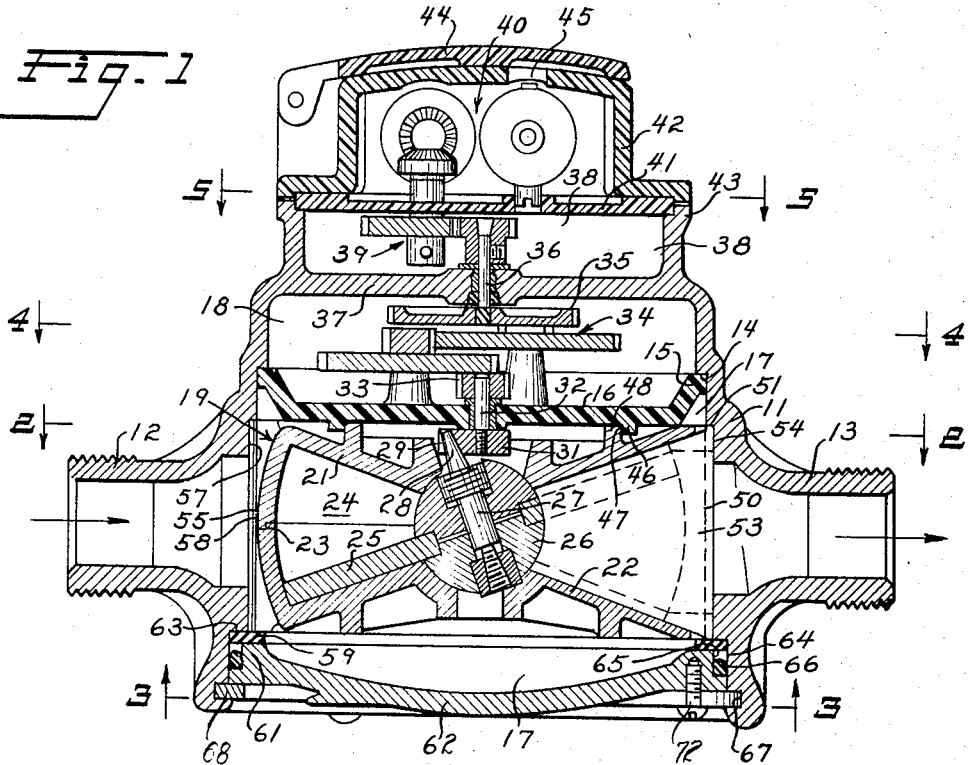
FIGURE 1 is a section through the meter assembly showing the novel combination of parts.

The meter assembly of the preferred embodiment of the invention comprises an integral hollow body 11 having an inlet port 12 and on outlet port 13. Internally body 11 is formed with a continuous flat downwardly facing surface 14 aganist which is tightly seated the peripheral flange 15 of a dish-shaped gear mounting plate 16 which in the assembly separates the liquid containing chamber 17 of the meter from the reduction gearing chamber 18 directly above it.

A measuring chamber assembly indicated at 19 and comprising upper and lower casing parts 21 and 22 having a liquid tight peripheral edge joint 23 and enclosing a chamber 24 in which is disposed a nutating disc piston 25 having a central spherical hub 26 seated in opposed casing sockets and mounting an inclined spindle 27 having its conical tip 28 operatively disposed in the slot 29 of a dog 31 fixed on the lower end of a vertical shaft 32 journalled centrally in plate 16.

A gear 33 is fixed on the upper end of shaft 32 within chamber 18 and a train of meshed gears indicated at 34 in chamber 18 drive connects gear 33 to a gear 35 fixed on the lower end of a vertical register drive shaft 36 that is journalled centrally in an integral transverse wall 37 of body 11. The gears of train 34 are all supported on plate 16, and gear 33 and dog 31 combine to fix shaft 32 axially on plate 16. Body 11 has a cup-shaped upwardly open chamber 38 at its upper end within which is gearing 39 connecting shaft 36 to the register mechanism indicated at 40 and supported on a register base plate 41 of molded plastic that extends over and closes chamber 38. A register housing 42 of molded plastic is suitably secured to the upper peripheral flange 43 of body 11 and clamps the periphery of base plate 41 between them. A hinged housing cover 44 normally covers the upper register sight openings as at 45.

Figure 2:
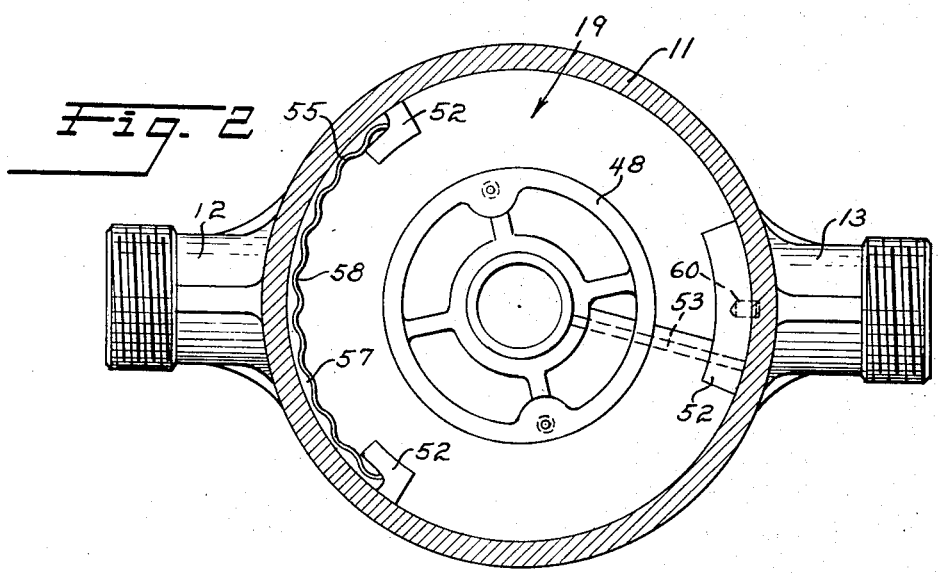
FIGURE 2 is a section on line 2—2 of FIGURE 1, showing the spring filter device.

Gear mounting plate 16 has formed on its lower side an annular boss 46 having a cylindrical inner surface 47 for piloting and receiving a similarly shaped annular boss 48 on the upper side of the measuring chamber. This locates the measuring chamber assembly 19 coaxially with shaft 32 in the meter. An annular flat downwardly facing surface 51 machined within the body 11 provides a seat against which the measuring chamber 19 is tightly urged in the meter assembly, spaced lugs 52 (FIGURE 2) on the upper casing portion having flat faces engaging this surface.

The usual division plate 53 is mounted to one side of the outlet port opening with its outer edge seated in a body slot 54 and extending into the measuring chamber in the usual manner.

Diametrically opposite the outlet opening an arcuate perforated plate 55 is mounted essentially across the inlet port opening. This plate is perforated (FIGURE 4) at 56 so as to serve as a filter screen or strainer for the liquid passing therethrough and is a corrugated sheet of resilient metal (FIGURE 2) that in the assembly is effectively compressed between the inner body wall 57 and the outer peripheral surface 58 of the measuring chamber assembly, so that the entire measuring chamber assembly 19 is tightly resiliently urged to the right in FIGURE 1 to aid the liquid tight seal at the outlet port. This seal is effected by the edges of opening 50 of the measuring chamber engaging the body wall around the outlet port at one side of division plate 53. At the other side of division plate 53, opening 50 communicates with chamber 17.

The combined spring and strainer member 55 is seated axially upwardly on body surface 51 and its lower edge contacts a resilient washer 59 of synthetic rubber or the like that is compressed between the annular rib 61 of bottom body cover 62 and the internal annular cover seating surface 63. Cover 62 axially slidably fits into the bottom body bore 64 and has an external annular recess 65 in which is radially compressed an O-ring 66 of synthetic rubber or like resilient material.

The lower end of bore 64 has an annular recess 67 adapted to receive a locking ring assembly 68 that abuts the bottom of cover 62 to maintain the assembly. Preferably ring assembly 68 comprises two, three or more ring sections 69 having adjacent inwardly bent ends 71 axially bridged by the heads of holding screws 72, as shown in FIGURE 3, threaded into the body.

The entire meter assembly is of novel construction, all parts except the register housing 42, base plate 41 and the contents of chamber 38 being inserted through the bottom body bore 64. First the gear mounting plate 16, which is preferably a molded stiff plastic such as nylon, has the reduction gears mounted on it and it is thrust into seating contact with surface 14. Then the axially rigid measuring chamber assembly 19 is inserted, being piloted and centered by telescoping engagement of bosses 46 and 48 and circumferentially located by dowel 60 and division plate 53, and the measuring chamber assembly 19 firmly seats on surface 51 so that no injurious axial force is exerted on plate 16 that might buckle it to make it leak or bind the gear journals.

The spring strainer 55 which when relaxed is a corrugated straight plate is inserted and it is flexible enough to bend and conform to the contour of the walls between which it is compressed.

Then washer 59 is seated at 63, and the cover 62 inserted and locked in place by ring assembly 68. The dimensions of the parts are such that locking ring assembly 68 combines with resilient washer 59 to maintain a tight seating of the measuring chamber on surface 51 and the uniformly distributed annular contact of boss 48 with plate 16 urges that plate sufficiently tightly onto seat 14 to insure that no liquid leaks into chamber 18.

In the assembly spring strainer member 55 which is preferably a perforated corrugated sheet of Phosphor bronze for corrosion resistance and high resiliency constantly biases the measuring chamber assembly into sealing engagement with the body wall at the outlet port.

Prior to this invention it was considered necessary to machine the internal body wall with a 1° taper so that the measuring chamber assembly would be wedged tightly therein in an effort to obtain a good seal, and the need for this costly machine operation has been eliminated by the foregoing structure.

In operation liquid entering inlet 12 enters the measuring chamber 24 by way of chamber 17 and opening 50 to one side of division plate 53, to cause nutating oscillation of piston 25 which is converted by spindle 27 and dog 31 to rotation of shaft 32 to drive the register 40 through reduction gearing 34. The liquid from the measuring chamber 24 all discharges through sealed opening 50 at the other side of division plate 53 into outlet port 13. The details of the measuring chamber and drive (not shown) are conventional and not believed to be necessary to understand the invention herein claimed. The measuring chamber may be that of Weymouth Patent No. 1,880,223.

The above described meter assembly provides a compact arrangement of minimum height which enables the meter to be used where space limitations will not permit the usual meter to be introduced, and the use of shorter adequately journalled shafts in the drive train minimizes friction losses. Assembly costs are reduced, and assembly operations are carried out by less skilled labor than hitherto required.

An important feature of the assembly of the invention is the sealed gear chamber 18 the top and side walls of which are integral body walls and the bottom wall of which is the water resistant plate 16 tightly and peripherally sealed at seat 14. The usual liquid tight packings are provided about shafts 32 and 36 and these are not disturbed during assembly of the meter components.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a meter assembly, a body having inlet and outlet ports, a measuring chamber unit mounted within said body adapted to receive liquid from said inlet port and discharge it into said outlet port, and a strainer in the path of said liquid at said inlet port, said strainer being a resilient member compressed between the measuring chamber unit and the internal body wall and constantly laterally urging said unit into sealing association with the body at said outlet port.

2. In the assembly defined in claim 1, said strainer being a corrugated perforated sheet of transversely resilient corrosion resistant metal.

3. In the assembly defined in claim 2, said sheet being normally straight when relaxed but bending in the assembly to conform to the contour of the confining walls, the opposite sides of said sheet being respectively seated against the interior of said body and the exterior of said unit.

4. In the assembly defined in claim 1, a gear mounting plate seated in said body above said unit, and means urging said laterally biased measuring chamber unit toward said plate in the assembly.

5. In a meter assembly, a body that is open at its lower end and provided at the top with an integral transverse wall, a removable transverse gear mounting plate seated against a downwardly facing surface in said body and dividing the interior below said wall into an upper gear chamber and an isolated lower liquid containing chamber, inlet and outlet ports in the body, a measuring chamber unit mounted within said liquid containing chamber and having a measuring element movable in response to fluid flow through said liquid containing chamber, a combined strainer and biasing spring member interposed between said unit and the body wall at the inlet port and urging said unit tightly against said body at said outlet port, a bottom cover holding said unit tight against said plate, a removable locking assembly for said cover mounted on said body within the open lower end thereof, said body having an integral tubular upward extension above said wall, a register device mounted upon said extension, register drive gearing enclosed by said extension, a rotatable shaft extending in liquid sealed relation through said wall to drive said register gearing and a register drive train contained in said gear chamber and adapted to provide an operative connection between said measuring element and said shaft.

6. In a meter assembly, a hollow body having a bore through which meter components are inserted during assembly, a cover slidably insertable into said bore and adapted to retain said inserted components, a resilient washer interposed between said cover and said body, and said cover having an annular peripheral groove in which a resilient O-ring is radially compressed between the cover and said bore, and means for locking said cover to the body comprising groove means defined in said body to open radially inwardly into said bore and having axially opposed side walls, at least two ring segments mounted in said groove means, said ring segments being confined between said axially opposed walls and abutting the lower side of said cover, and removable fasteners securing the ring ends on the body.

7. In a water or like meter assembly, a body having an outlet port and an inlet port in circumferentially spaced relation, a measuring chamber unit within said body, and a flexible metal spring laterally biasing said unit toward said outlet port, said spring being located to cover the inlet port and being formed to filter the incoming liquid.

8. The meter assembly defined in claim 1 wherein said measuring chamber unit is defined with inlet and outlet openings respectively in fluid communication with said inlet port and said outlet port, the edges around said outlet opening being biased by said strainer into engagement with the internal surface of said body around said outlet port to assure a liquid tight seal at said outlet port.

9. In the meter assembly defined in claim 1, coacting surface means formed on said unit and said body around said outlet port for providing a liquid tight seal between said unit and said body at said outlet port, said strainer being disposed diametrically opposite said outlet port to bias the surface means on said unit into sealing engagement with the surface means on said body.

References Cited

UNITED STATES PATENTS

| | | | |
|---|---|---|---|
| 520,195 | 5/1894 | Thomson | 73—258 |
| 783,518 | 2/1905 | Gums et al. | 73—277 |
| 960,835 | 6/1910 | Daniels | 210—498 X |
| 1,015,407 | 1/1912 | Selg | 210—298 X |
| 1,317,273 | 9/1919 | DeLaval et al. | 73—277 X |
| 1,648,491 | 11/1927 | McAllister | 73—258 X |
| 1,972,526 | 9/1934 | Larrabee | 73—258 |
| 2,068,511 | 1/1937 | Raisch | 210—498 X |
| 2,083,825 | 6/1937 | Bousfield | 73—431 X |
| 2,159,892 | 5/1939 | Hanks | 73—272 X |
| 2,972,886 | 2/1961 | Hanks | 73—258 |

FOREIGN PATENTS

| | | |
|---|---|---|
| 662,993 | 5/1963 | Canada. |
| 313,575 | 10/1903 | France. |
| 612,642 | 8/1926 | France. |
| 26,859 | 3/1897 | Great Britain. |

RICHARD C. QUEISSER, *Primary Examiner.*

JAMES J. GILL, *Examiner.*

EDWARD GILHOOLY, *Assistant Examiner.*